United States Patent Office 3,579,321
Patented May 18, 1971

3,579,321
AMMONIUM PHOSPHATE FERTILIZER
COMPOSITION AND METHOD
Jerry H. Stoller, Springfield, Ill., assignor to Brandt
Chem. Co., Inc., Pleasant Plains, Ill.
No Drawing. Filed Mar. 9, 1970, Ser. No. 18,402
Int. Cl. C05f 11/00
U.S. Cl. 71—25                               10 Claims

ABSTRACT OF THE DISCLOSURE

A fluid ammonium phosphate composition and method utilizing wet process phosphoric acid or spent phosphoric acid which contain metallic impurities. Lignin sulfonate is added to the acid prior to ammoniation in sufficient quantities to prevent formation of gelatinous precipitate during ammoniation.

---

This invention relates to fluid ammonium phosphate fertilizer compositions and to a method of making the same. More particularly, it relates to aqueous ammonium phosphate compositions prepared from crude "wet process" acid and "rinse acid" containing impurities of iron and/or aluminum.

Wet process phosphoric acid is obtained by treating phosphate rock, and usually provides between about 20% to 60% available $P_2O_5$. It is a relatively impure composition containing quantities of calcium, sulfate, fluorides, and fluorosilicates as well as aluminum, magnesium, iron and other metals.

Rinse acid or spent acid is a by-product of the plating and metal-brightening industry, and yields approximately 20% to 50% available $P_2O_5$. It too, however, contains substantial metallic impurities such as aluminum and/or iron, usually in amounts of between 1% and 4%.

The economies of use of "wet process" or "rinse" acid in the preparation of fluid ammonium phosphate fertilizer have long been recognized. However, the problems encountered as a result of the presence of the metallic impurities in the acid have significantly detracted from development of a commercially suitable product.

Addition of ammonia to phosphoric acid of the type described causes precipitation of the metallic impurities forming a gelatinous, gummy mass of high viscosity, generally unsuitable for use in liquid fertilizer spray equipment. Such material is considered to have generally short storage or shelf life. Further, the gelatinuous mass is incapable of being separated from the aqueous base without the employment of complicated and expensive filtration equipment.

The disastrous effect of the addition of ammonia to these types of phosphoric acid that include metallic impurities is particularly prevalent when the "batch method" of preparation is utilized. In order to include adequate quantities of ammonia, the pH of the phosphoric acid solution is increased from a normal minimum of less than 1.0 to 6.5, or higher. While passing through the chemical phase of pH of 4.0 to pH 5.0, the iron-aluminum phosphate complex (gels) form. Simultaneous addition of acid and ammonia, as in the continuous process method, elevates the problem somewhat, but not enough to entirely prevent formation of the undesirable precipitated gel.

Many attempts have been made to produce ammoniated phosphoric acid product utilizing the economic wet process of rinse acid. However, the methods employed have required precise control of parameters, such as pH, and temperature, or have required complicated arrangements for agitation, recycling and mixing of the composition being prepared. Also, attempts have been made, without significant success, to solve the problem by addition of clay as a dispersing agent.

Accordingly, it is the principal object of the present invention to provide an improved ammonium phosphate composition and a method for its production which enables utilization of economical wet process or rinse acid containing metallic impurities.

Very generally, the invention is directed to the addition of lignin sulfonate to the phosphoric acid in prescribed quantities, prior to the addition of the ammonia to prevent the formation of metallic-phosphate gels. Subsequent to the addition of lignin sulfonate, ammonia or ammonium hydroxide is added in sufficient quantities to produce a fertilizer having acceptable nutrient value. The resulting composition remains fluid, and is free from the presence of undesirable gels. It is readily usable with fertilizer spray equipment.

By the addition of the lignin sulfonate to the acid prior to ammoniation, it is believed that a certain degree of chelation or molecular attraction of the metal takes place. In addition, lignin sulfonate possesses dispersion and foaming properties that aid in prevention of gels.

Sulfonated lignin materials suitable for use in the preparation of the composition of this invention include sulfonated alkali lignin, i.e., sulfonated kraft, lignin, calcium or sodium lignin, or the like, produced by precipitating lignin material and treating it with either sulfurous acid or water soluble bisulfite until a water soluble sulfonated lignin is formed. Sulfite spent liquor containing primarily lignin sulfonates are also suitable. The lignin sulfonate is in the form of a liquid and contains about 50% by weight solids, although a wide range of solid concentrations may be used.

The phosphoric acid to which the lignin sulfonate is added may be either wet process or rinse acid which contains impurities of iron and/or aluminum, the type of acid normally not considered suitable for ammoniation unless it is handled by special equipment or disposed of in a short period of time. Generally, 54% grade acid is preferred since it provides about 50 to 55% available $P_2O_5$. Any concentration of available $P_2O_5$ may be used depending upon the purpose for which the ammonium phosphate composition is intended.

It has been found that with either wet process phosphoric acid or rinse acid, the included metallic impurities range from between 1% and 4% by weight elemental metal. However, it is contemplated that their value could vary widely. To accommodate this range of metallic impurities, it has been determined that the addition of at least ¼% by weight of lignin sulfonate expressed as solid content is effective to prevent formation of a gel during ammoniation. About 1% is preferred. The maximum amount of lignin sulfonate used will vary, depending upon the solid content of the lignin, the amount and types of metallic material in the acid, the concentration of $P_2O_5$ and/or ammonia in the final composition. It is believed that up to 10% may be used in some compositions without adverse effect.

Ammoniation is accomplished by the addition of anhydrous ammonia, or ammonium hydroxide ($NH_4OH$), or any other solution suitable for the purpose of ammoniation of phosphoric acid such as ammonium-ammonium nitrate solutions. Thereafter, other desirable additives, such as potash, or the like, may be included to provide a complete fluid fertilizer solution.

The ammonium phosphate composition is prepared by the batch method as follows:

Lignin sulfonate is mixed with a quantity of phosphoric acid. The lignin may be added directly to the acid, or it may first be placed in aqueous solution to which the acid is later added. Also, lignin may be added to a water-acid mixture. The important factor is that the lignin be thoroughly dispersed in the solution prior to ammoniation. The amount of lignin sulfonate, based on the ratio by weight of solids content of the lignin to available $P_2O_5$, should fall in the range of between about 1:2 to 1:70. Preferably, a ratio of about 1:20 has been found suitable for use with currently utilized fertilizer formulations.

After the lignin sulfonate and acid has been thoroughly mixed, anhydrous ammonia, or ammonium hydroxide, is added to ammoniate the acid. Any preferred concentration may be provided, depending upon the ultimate use of the mixture. Normally, the range would be 1 lb. of nitrogen to 3 lbs. of $P_2O_5$ by weight, which would render a fairly neutral solution. Minor variations in pH are of course acceptable.

Adding the ammonium hydroxide, or anhydrous ammonia, raises the pH level from about 1.0 to approximately 6.0, or higher. Without the prior addition of the lignin sulfonate, the entire solution would form a thick gelatinous mass with time. However, using lignin sulfonate, the metallic salts present in the wet process or spent acid are retained, possibly by combined effect of partial chelation of the metals, and also the foaming and suspension property of the lignin.

Addition of the ammonium hydroxide, or anhydrous ammonia, to the previously treated acid is exothermic, and the temperature may rise to about 212° F. and the solution will boil. It is not necessary to control the solution temperature by external means for any minimum length of time, nor is it necessary to hold the pH at any given value during the mixing process.

Finally, potash may be added to the solution to complete the fertilizer composition. Any desired amount may be added, depending on the desired formulation of the resulting composition.

The following examples are illustrative of the ammonium phosphate composition and method of the present invention. Percentages are listed by weight.

EXAMPLE I

A fluid ammonium phosphate fertilizer was prepared containing 9% nitrogen and 27% $P_2O_5$.

The acid used was 54% wet process acid containing metallic impurities of iron and aluminum. Lignin sulfonate liquid having a 50% solids content was used. The batch method was used. The composition was as follows:

| | Percent |
|---|---|
| Water | 7½ |
| Lignin sulfonate | 2 |
| Phosphoric acid | 50 |
| Clay | 3 |
| 29% ammonium hydroxide | 37½ |

The lignin sulfonate was first mixed with the water and thoroughly dispersed. Thereafter, the phosphoric acid was added. The clay was then added. The addition of clay was for the purpose of retaining nitrogen salts present in the final solution in suspension and not necessary to the prevention of formation of a gelatinous precipitate upon ammoniation.

Thereafter the phosphoric acid was ammoniated with the ammonium hydroxide to a resulting pH of about 6.2.

Upon cooling the final composition remained fluid and no gelatinous precipitate was noted. The fluid remained pourable and suitable for use with conventional spraying equipment.

EXAMPLE II

A second example is an 8-24-0 fertilizer composition. The acid was 54% wet process phosphoric acid and the lignin sulfonate included 50% solids. The composition was as follows:

| | Percent |
|---|---|
| Water | 20.8 |
| Lignin sulfonate | 1.5 |
| Phosphoric acid | 44.4 |
| 29% ammonium hydroxide | 33.3 |

This composition was mixed as in Example I. The resulting pH was about 6.0. No clay was used since the salt concentration was low enough to be completely dissolved in solution.

EXAMPLE III

A liquid suspension fertilizer having a 5-15-30 analysis was prepared as follows:

A quantity of wet process phosphoric acid containing metallic impurities was placed in a mixing vat. The acid was 54% grade, that is 54% available $P_2O_5$ and represented 28% of the final composition by weight. Next, lignin sulfonate was added to the acid in the amount of 1% of the final solution. The lignin sulfonate had 50% available solids. Thereafter the acid was ammoniated with 29% ammonium hydroxide. A total quantity of ammonium hydroxide was added to represent 21% of the final composition. This raised the pH from 2 to about 6.5. Finally potash (muriate of potash) in the amount of 48% of the total solution was added to complete the composition.

The resulting fertilizer was fluid and completely suitable for use in spraying equipment. No metallic gels were encountered.

EXAMPLE IV

A fluid ammonium phosphate fertilizer was made using spent acid containing metal impurities of iron and aluminum. The acid was 48% spent acid, that is 48% available $P_2O_5$. The liquid lignin sulfonate had a 50% solids content. The composition was a 4-12-24 fertilizer. The composition was:

| | Percent |
|---|---|
| Water | 16.6 |
| Lignin sulfonate | 1.0 |
| Phosphoric acid | 25.0 |
| Clay | 2.0 |
| 29% ammonium hydroxide | 16.7 |
| 62% muriate of potash | 38.7 |

This composition was mixed as in Example I with the exception of potash which was added last.

In addition to the examples above, fluid ammonium phosphate compositions have been prepared using lignin sulfonate to prevent formation of a gelatinous mass during ammoniation for the following fertilizer grades:

| Nitrogen | Phosphate | Potash |
|---|---|---|
| 3 | 10 | 30 |
| 3 | 9 | 27 |
| 13 | 13 | 13 |
| 4 | 12 | 28 |
| 6 | 18 | 18 |
| 2 | 6 | 12 |
| 3 | 10 | 10 |
| 20 | 10 | 5 |
| 4 | 12 | 30 |
| 10 | 30 | 0 |

Either wet process phosphoric acid or spent acid phosphoric acid was used. The amount of lignin sulfonate utilized fell within the previously described ranges of the ratio by weight of lignin solids to available $P_2O_5$. In each case a satisfactory fluid composition was formed devoid of gelatinous precipitate of the metal impurities.

What is claimed is:

1. A sprayable liquid ammonium phosphate composition comprising phosphoric acid having metal impurities in an amount of about one percent by weight of the acid of elemental metal, lignin sulfonate in an amount of between ¼% to 10% by weight of total solids to prevent formation of a gelatinous precipitate upon ammoniation, and an ammoniating solution.

2. A sprayable liquid ammonium phosphate composition as claimed in claim 1 wherein said lignin sulfonate solids are about 1% by weight of total solution weight.

3. A sprayable liquid ammonium phosphate composition as claimed in claim 1 wherein the ratio by weight of lignin sulfonate solids to available $P_2O_5$ is between 1:2 and 1:70.

4. A sprayable liquid ammonium phosphate composition as claimed in claim 3 wherein the ratio by weight of lignin sulfonate solids to available $P_2O_5$ is about 1:20.

5. A sprayable liquid ammonium phosphate composition as claimed in claim 1 including about 25.0% by weight of phosphoric acid having 48% available $P_2O_5$, about 1.0% by weight lignin sulfonate having 50% solids, about 16.6% by weight water, about 16.7% by weight of 29% ammonium hydroxide, and about 38.7% by weight of muriate of potash.

6. A sprayable liquid ammonium phosphate composition as claimed in claim 1 wherein said ammoniation solution is selected from the group consisting of anhydrous ammonia, ammonium hydroxide, and ammonium-ammonium nitrate solution.

7. A method of preparing a "fluid" sprayable liquid ammonium phosphate composition utilizing phosphoric acid containing metal impurities in an amount of about 1% by weight of the acid of elemental metal, the steps comprising mixing said phosphoric acid with lignin sulfonate in an amount of between ¼% to 10% by weight of total solids to prevent formation of a gelatinous precipitate upon ammoniation and thereafter ammoniating said phosphoric acid with an ammoniating solution and without temperature control.

8. A method of preparing a sprayable liquid ammonium composition as claimed in claim 7 wherein lignin sulfonate s added to provide lignin sulfonate solids in an amount of about 1% by weight of total solution.

9. A method of preparing a sprayable liquid ammonium phosphate composition as claimed in claim 7 wherein lignin sulfonate is added to provide a ratio by weight of lignin sulfonate solids to available $P_2O_5$ of between 1:2 to 1:70.

10. A method of preparing a sprayable liquid ammonium phosphate composition as claimed in claim 9 wherein lignin sulfonate is added to provide a ratio by weight of lignin sulfonate solids to available $P_2O_5$ of about 1:20.

References Cited
UNITED STATES PATENTS

| | | | |
|---|---|---|---|
| 1,607,666 | 11/1926 | De Haen | 71—33 |
| 3,041,160 | 6/1962 | Makower et al. | 71—43 |
| 3,109,729 | 11/1963 | Slack et al. | 71—43 |

REUBEN FRIEDMAN, Primary Examiner

C. N. HART, Assistant Examiner

U.S. Cl. X.R.

71—33, 64C